United States Patent
Kabir et al.

(10) Patent No.: US 9,925,518 B2
(45) Date of Patent: Mar. 27, 2018

(54) SOL-GEL POLYMERIC STATIONARY PHASES FOR HIGH-PERFORMANCE LIQUID CHROMATOGRAPHY AND SOLID PHASE EXTRACTION: THEIR METHOD OF MAKING

(71) Applicants: Abuzar Kabir, Dhaka (BD); Kenneth G. Furton, Homestead, FL (US)

(72) Inventors: Abuzar Kabir, Dhaka (BD); Kenneth G. Furton, Homestead, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 15/634,487

(22) Filed: Jun. 27, 2017

(65) Prior Publication Data

US 2017/0291158 A1    Oct. 12, 2017

(51) Int. Cl.

| | |
|---|---|
| *B01J 20/26* | (2006.01) |
| *B01J 20/291* | (2006.01) |
| *B01J 20/28* | (2006.01) |
| *B01J 20/10* | (2006.01) |
| *B01J 20/06* | (2006.01) |
| *C08K 3/22* | (2006.01) |
| *C08K 3/36* | (2006.01) |
| *B01J 20/30* | (2006.01) |
| *B01D 15/20* | (2006.01) |
| *B01D 15/30* | (2006.01) |
| *B01D 15/32* | (2006.01) |

(52) U.S. Cl.
CPC ............ *B01J 20/264* (2013.01); *B01D 15/20* (2013.01); *B01D 15/305* (2013.01); *B01D 15/322* (2013.01); *B01D 15/325* (2013.01); *B01J 20/06* (2013.01); *B01J 20/103* (2013.01); *B01J 20/262* (2013.01); *B01J 20/28047* (2013.01); *B01J 20/291* (2013.01); *B01J 20/3021* (2013.01); *C08K 3/22* (2013.01); *C08K 3/36* (2013.01); *B01J 2220/54* (2013.01); *C08K 2003/2241* (2013.01)

(58) Field of Classification Search
CPC .......... B01J 20/26; B01J 20/264; B01D 15/20
USPC ....................................................... 502/402
See application file for complete search history.

(56) References Cited

U.S. PATENT DOCUMENTS

2010/0213112 A1*  8/2010  Bischoff ................ B01D 15/22
                                                              210/198.2

* cited by examiner

*Primary Examiner* — Edward Johnson
(74) *Attorney, Agent, or Firm* — Saliwanchik, Lloyd & Eisenschenk

(57) ABSTRACT

A sol-gel sorbent or chromatography stationary phase is a particulate metal oxide gel containing polymeric segments uniformly distributed throughout the metal oxide gel. The metal oxide gel is an oxide from silicone or other metal oxide that can have one of the valence bonds attached to an organic group and the remainder occupied by oxygens that can be provided as an oxide or an alkoxide or aryl oxide of the polymeric segments. The particles are used for an SPE sorbent or as a packing for a reversed phase high-performance liquid chromatography (RP-HPLC), a normal phase high-performance liquid chromatography (NP-HPLC) column or a hydrophilic interaction liquid chromatography (HILIC) column.

6 Claims, 9 Drawing Sheets

*Exemplary Formulations of Sol Solutions for Non-Polar Analyte Gels*

| Compound | TMOS-PDMS | TMOS-MTMS-PDMS | MTMS-PDMS |
|---|---|---|---|
| TMOS (µL) | 1000 | 500 | N/A |
| MTMS (µL) | N/A | 500 | 1000 |
| PDMS (g) | 2.0318 | 2.0049 | 2.0032 |
| THF (µL) | 5300 | 5300 | 5300 |
| Acid catalyst (0.1 M HCl) (µL) | 470 | 470 | 470 |
| Base catalyst (NH4OH, 1M in isopropanol) (µL) | 250 | 250 | 250 |

Fig. 4

*Exemplary Formulations of Sol Solutions for Medium-Polar Analyte Gels*

| Compound | TMOS-PTHF | TMOS-MTMS-PTHF | MTMS-PTHF |
|---|---|---|---|
| TMOS (µL) | 1000 | 500 | N/A |
| MTMS (µL) | N/A | 500 | 1000 |
| PTHF (g) | 3.0343 | 3.0109 | 3.0241 |
| Isopropanol (µL) | 5080 | 5080 | 5080 |
| Acid catalyst (0.1M HCl) (µL) | 470 | 470 | 470 |
| Base catalyst (1 M NH4OH in Isopropanol) (µL) | 250 | 250 | 250 |

*Fig. 5*

*Exemplary Formulations of Sol Solutions for Highly-Polar Analyte Gels*

| Compound | TMOS-PEG | TMOS-MTMS-PEG | MTMS-PEG |
|---|---|---|---|
| TMOS (µL) | 4000 | 2000 | N/A |
| MTMS (µL) | N/A | 2000 | 8000 |
| PEG (g) | 8.0875 | 4.0265 | 8.0881 |
| Isopropanol (µL) | 20000 | 1500 | 3000 |
| Acid catalyst (µL) | 1880 (0.001M HF) | 1000 (1M TFA) | 2000 (0.1M TFA) |
| Base catalyst (1 M NH4OH in Isopropanol) (µL) | 1000 | 1500 | 3000 |

*Fig. 6*

| Compound | Molecular Weight | Log $K_{ow}$ | Chemical Structure |
| --- | --- | --- | --- |
| Furfuryl Alcohol (FA) | 98.10 | 0.3 | |
| Piperonal (PIP) | 150.13 | 1.05 | |
| Phenol (PHE) | 94.11 | 1.5 | |
| Benzodioxole (BDO) | 122.12 | 2.08 | |
| 4-Nitrotoluene (4NT) | 137.14 | 2.45 | |
| 9-Anthracene Methanol (9AM) | 208.26 | 3.04 | |
| Naphthalene (NAPH) | 128.17 | 3.35 | |
| 1,2,4,5-Tetramethyl Benzene (TMB) | 134.22 | 4 | |
| Triclosan (TCL) | 289.54 | 4.53 | |
| Diethylstilbestrol (DESB) | 268.35 | 5.07 | |

Fig. 7

SOL-GEL POLYMERIC STATIONARY PHASES FOR HIGH-PERFORMANCE LIQUID CHROMATOGRAPHY AND SOLID PHASE EXTRACTION: THEIR METHOD OF MAKING

BACKGROUND OF INVENTION

Stationary phase is the heart of chromatographic separation process. Due to the absence of suitable common stationary phase immobilization technique, gas chromatography and liquid chromatography utilize completely two different types of materials as the separation media: polymeric stationary phases for gas chromatography and monomeric stationary phases for liquid chromatography. Immobilization of stationary phase in gas chromatography is relatively simple and straightforward and generally involves free radical cross-linking or chemical bonding technique. Unlike gas chromatography, stationary phase in liquid chromatography makes direct contact with the mobile phase in its liquid state, and hence requires strong chemical anchorage with the substrate to prevent from washing away with the mobile phase.

In order to prevent from losing the stationary phase by dissolving in the mobile phase, reversed phase and normal phase high-performance liquid chromatography (RP-HPLC, NP-HPLC) were evolved with exclusively different combinations of stationary phase and mobile phase. RP-HPLC utilizes non-polar stationary phases and polar mobile phases, whereas NP-HPLC utilizes polar stationary phases and non-polar mobile phases. This artificial classification and exclusivity in stationary phase/mobile phase selection substantially limit the power of high-performance liquid chromatography. As such, a limited number of monomeric nonpolar stationary phases including C4, C8, C18, and C30 are used in RP-HPLC and diol, cyano, and amino polar monomeric ligands are used in NP-HPLC.

The strict restrictions in selecting stationary phase/mobile phase combination has been relaxed to some extent after the introduction of bonded phases where monomeric entities are chemically bonded to the surface silanol groups present on silica substrate via silane chemistry. This approach of creating bonded phases has undoubtedly improved column performance, increased pH stability and prolonged its lifetime. The advent of the bonded phases led to a new direction in liquid chromatography known as hydrophilic interaction chromatography (HILIC). HILIC is a hybrid liquid phase separation approach that combines, to a great extent, reversed phase and normal phase liquid chromatography. HILIC expands the separation power of liquid chromatography towards highly polar analyte(s) that can't be dealt in normal phase chromatography due to the restricted choice of organic solvents (e.g., hexane, isooctane, carbon tetrachloride) in which many of the polar analytes are barely soluble. HILIC employs a polar stationary phase, such as silica, diol, amino, and cyano phases that are used for normal phase liquid chromatography and uses polar organic or organo-aqueous solvent system as the mobile phase, such as those used in as in reversed phase liquid chromatography. Recently, introduction of bonded phases, such as diol, cyano, and amino ligands by bonding to a silica substrate via silane chemistry has allowed polar organic or organo-aqueous mobile phases to be used in hydrophilic interaction chromatography. Unfortunately, due to relatively weak bonding between the silica substrate and the organic ligands in these "so called" bonded phases, phase-bleeding often occurs upon exposure to polar organic solvents or organo-aqueous solvent mobile phases, resulting in a continuous shift in chromatographic retention and selectivity change due to the exposure of free surface silanol groups of the silica support.

Supports for reversed phase high-performance liquid chromatography (RP-HPLC), normal phase high-performance liquid chromatography (NP-HPLC) or HILIC are silica particles coated with organic ligands via silane chemistry. As a result, only a very small portion of the stationary phase contributes to retention and selectivity. The current bonded phases in RP-HPLC, NP-HPLC, and HILIC suffer from a number of shortcomings: silica particles limit the loading of organic ligands; silane chemical bonding of target organic ligands to the substrate surface steric limits incorporation of organic ligands leaving many surface silanol groups on the silica surface; and low carbon loading of organic ligands results in chemical instability, particularly using basic solvents.

It is evident that regardless of the separation mode used in high-performance liquid chromatography, all stationary phases are based on monomeric ligands with limited intermolecular interaction capability extended towards the analytes. For example, reversed phase stationary phases interact with the analytes with weak London dispersion forces and normal phases use limited dipole-dipole interaction/hydrogen bonding. Maximum separation/extraction potential of HPLC can only be utilized when all possible intermolecular interactions including London dispersion, dipole-dipole interaction, hydrogen bonding and $\pi$-$\pi$ stacking interactions are exercised.

Unlike high-performance liquid chromatography, solid phase extraction utilized silica particles coated with similar organic ligands as seen in HPLC stationary phases and therefore the choices are limited. Chemical incorporation of various organic polymers into the sol-gel hybrid inorganic-organic matrix would open up the possibility of creating hundreds of novel sorbents with unique selectivity.

Organic polymers/macromeres/dendrimer/biopolymer represent a class of compound possessing versatile surface chemistry with unique and rich functionality. A successful immobilization technique such as sol-gel synthesis can chemically incorporate these polymers in a 3D network of metal oxides e.g., silica, germania, titania backbone. All gas chromatographic stationary phases including polysiloxanes, polyethylene glycols, phenylpolycarborane-siloxanes as well as other polymers not being used as gas chromatographic stationary phases can be readily used as liquid chromatographic stationary phases if they possess at least one terminal hydroxyl functional group. The effective incorporation of flexible organic polymer into rugged inorganic polymeric network may dramatically and synergistically expand the separation power of HPLC as well as the extraction efficiency when used as solid phase extraction sorbents.

Stationary phases for RP-HPLC, NP-HPLC, and HILIC that overcome the inherent shortcomings of the current stationary phase manufacturing technology is the focus of the invention, where a sol-gel synthesis generates the support and the organic functionality simultaneously. Organic units can be included as hydroxyl terminated monomers and polymers, and included by condensation with the sol-precursors, sol, or gel. A method of preparation that separately promotes hydrolysis of sol-precursors to the sol and condensation of the sol to the gel is carried out. Due to the strong chemical bonding between the 3D network of metal oxide and organic monomer/polymer/macromere/dendrimer, the invention opens up the possibility of eliminating artificial classification of reversed phase and normal phase high-performance liquid chromatography into a unified high-performance liquid chromatography that can use any polymeric stationary phase of desired polarity in combination with any organic solvent (nonpolar, medium polar, polar) or organo-aqueous solvent as the mobile phase to achieve the desired separation goal. In addition, the new approach will allow scientists to exploit high chemical stability (pH 1-13) and thermal stability of the sol-gel polymeric stationary phases and solid phase sorbents to maximize the separation potential as well as the extraction efficiency.

BRIEF SUMMARY

In an embodiment of the invention, a sol-gel extraction sorbent or chromatography stationary phase is particles of a metal oxide gel containing polymeric segments uniformly distributed throughout the metal oxide gel. The metal oxide gel is a gel formed by sol-gel hydrolysis and condensation from one or more hydrolysable precursor where metal sites in the gel have the structure $R_xMO_{(y-x)}$, where M is titanium, aluminum, zirconium, germanium, barium, gallium, indium, thallium, vanadium, cobalt, nickel, chromium, copper, iron, zinc, boron or any mixture thereof, x is 0 or 1, y is the valence of the metal, and R is $C_1$ to $C_6$ alkyl or any $C_6$ to $C_{14}$ aryl or polyaryl group where the alkyl or aryl group optionally is functionalized with $C_1$ to $C_{20}$ alkyl, $C_6$ to $C_{14}$ aryl, halo, hydroxy, alkoxy, aryloxy, or any other group incapable of neutralizing an acidic or basic catalysts useful for forming the metal oxide gel. The polymer or even an oligomer is selected from at least one of silicones, polyethers, acrylates, methacrylates, polyesters, or polyamides. In embodiments of the invention, the metal oxide gel is a silicon oxide gel where the polymeric segments are polydimethylsilioxanes, polytetrahydrofurans, or polyethylene oxides. The sol-gel sorbent or chromatography stationary phase can include capped MOH groups having non-functional or functional trialkylsilane and/or an aryl dialkylsilane forming MOSi bonded groups.

Embodiments of the invention are directed to a method of preparing the sol-gel sorbents or chromatography stationary phases by providing: a mixture of metal oxide precursors, water and, optionally, a solvent; a polymer comprising at least one hydroxyl group and, optionally, the solvent or a second solvent; and an acid catalyst. Hydrolysis is promoted by mixing the metal oxide precursors, water, polymer, acid catalyst, and, optionally, solvent(s). Condensation to the metal oxide gel is promoted by adding a basic catalyst, optionally, a same or different solvent, and, optionally, with warming. Upon crushing or grinding the gel to form a particulate sol-gel sorbent or chromatography stationary phase according to claim 1.

In an embodiment of the invention, a reversed phase high-performance liquid chromatography (RP-HPLC), a normal phase high-performance liquid chromatography (NP-HPLC) column or a hydrophilic interaction chromatography (HILIC) column is formed using the stationary phases that are metal oxide gels containing polymeric segments uniformly distributed throughout the metal oxide gels.

BRIEF DESCRIPTION OF DRAWINGS

FIG. 4 is a table of the components combined into exemplary sols during the preparation of sorbents or normal phase chromatography supports including hydroxyl terminated polydimethylsiloxane for absorbing or separating non-polar analytes, according to embodiments of the invention.

FIG. 5 is a table of the components combined into exemplary sols during the preparation of sorbents or normal phase chromatography supports including polytetrahydrofuran (poly-THF), for absorbing or separating medium-polar analytes, according to embodiments of the invention.

FIG. 6 is a table of the components combined into exemplary sols during the preparation of sorbents or normal phase chromatography supports including polyethylene oxide (PEO), for absorbing or separating highly-polar analytes, according to embodiments of the invention.

FIG. 7 is a table of compounds employed for evaluation of SPE sorbents, according to embodiments of the invention.

DETAILED DISCLOSURE

Figure 1:
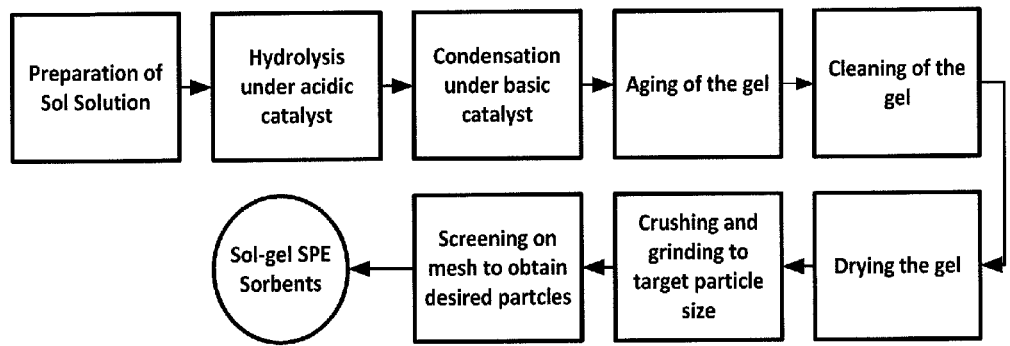
FIG. 1 is a flow chart for the preparation of a particulate solid phase extraction sorbent via a sol-gel process involving a two-step acid-base catalyzed sol-gel process, according to an embodiment of the invention.

In embodiments of the invention, reverse phase high-performance liquid chromatography (RP-HPLC), normal phase high-performance liquid chromatography (NP-HPLC) and hydrophilic interaction chromatography (HILIC) particulate stationary phases and solid phase extraction (SPE) sorbents are prepared by sol-gel chemistry where polymeric segments, with or without specific additional functional groups, are included throughout the gel comprising stationary phase. Although the gel can be used for the stationary phase for RP-HPLC, NP-HPLC or HILAC, the gel is often referred to herein as only a stationary phase or as an SPE sorbent throughout this specification, it should be understood that the particulate gel can be employed in for any of a RP-HPLC stationary phase, NP-HPLC stationary phase, HILIC stationary phase, or SPE sorbent. The process, as indicated in FIG. 1, involves the acid catalyzed hydrolysis of silanes, such as, but not limited to, alkyltrialkoxysilanes and tetraalkoxysilanes. A hydroxyl functional polymer, is included in the sol and subsequent condensation of the resulting silanols and hydroxyl functional groups of the polymer forms a gel network that ultimately is the sol-gel sorbent or stationary phase when crushed to a desired particulate size. The polymer can be of any size, including sizes that are sufficiently small to be characterized as oligomers. For example the polymer incorporated into the gel can have two to 10,000 repeating units.

The hydroxyl functional polymer, or precursors to the hydroxyl functional polymer can be those with functional groups to interact with a non-polar, medium-polar, or highly-polar analyte of interest for analysis in the fields of forensic investigation, safety monitoring, or other purposes. The polymers, or precursors thereto, can be silicones, polyethers, acrylates, methacrylates, polyesters, polyamides other vinyl addition polymers, or other condensation polymers. Mixtures of miscible polymers can be used to form the gels. The polymers can be homopolymers or co-polymers, ter-polymers, or with multiple different repeating units where repeating units can be in a block, graph, branched, or dendritic relationship. Functional units within the polymers, or the polymers themselves, can be in an organized relationship, such as, but not limited to that of crown ethers, cryptand, cyclodextrins, fullerenes, nanotubes, or any other relationship where there is at least one hydroxyl functionality on the oligomeric or polymeric structure. Although throughout this specification the term polymer shall be used, it is to be understood that any oligomer, a small polymer of two to ten repeating units, or one or more precursors to a hydroxyl functional oligomer or polymer can be used.

The silicon oxide precursors that can be used are silanes with three and/or four hydrolysable groups selected from hydrogen, alkoxy, hydroxy, halide, dialkylamino, or any combination thereof attached to the Si atom. Where there are three hydrolysable groups the remaining functionality can be any $C_1$ to $C_{20}$ alkyl or any $C_6$ to $C_{14}$ aryl or polyaryl group where the alkyl or aryl group can be functionalized with $C_1$ to $C_6$ alkyl, $C_6$ to $C_{14}$ aryl, halo, hydroxy, alkoxy, aryloxy, or any other functionality that would not neutralize the acidic or basic catalysts used to form the sol-gel sorbent. Alternatively or additionally, other metal oxide precursors can be used to the silicon oxide precursors, including oxides of titanium, aluminum, zirconium, germanium, barium, gallium, indium, thallium, vanadium, cobalt, nickel, chromium, copper, iron, zinc, boron or any mixture thereof. When different metal oxide precursors are used, the different precursors can be combined before hydrolysis or hydrolysis or partial hydrolysis of the individual metal oxide precursors can be carried out before combination.

The gel can be used as prepared after crushing or otherwise forming particles. Optionally, after gelation and particle formation, silane coupling agent, such as, but not limited to, trimethylchlorosilane, $C_2$ to $C_{20}$ alkyldimethylchlorosilane, hexamethyldisilazane, bis-$C_2$ to $C_{20}$ alkyltetramethysilazane, or $C_1$ to $C_{20}$ alkyldimethylaminodimethysilane can be used to condense with all or any portion of the remaining silanol or hydroxy groups to form the final SPE sorbent, that contains fewer, if any silanol or undesired hydroxy groups.

Sol-gel chemistry offers a unique bottom-up synthesis approach where, instead of using silica or other metal oxide particles as inert support to attach functional groups to free silanol or MOH functionality on the particle surface, a network of the stationary phases possessing homogeneous distribution over the entire surface and within the gel network with the organic ligands chemically bound throughout the gel's network. The resulting metal oxide gel has excellent chemical, thermal and solvent resistance. This results in a greater number of readily accessible interaction sites for the components being separated by chromatography per unit mass of the stationary phase for separation and/or SPE sorbents for extraction of hydrophilic analytes. The particulate gels, according to an embodiment of the invention, allow rapid association with analytes with functionality of the stationary phases or SPE sorbent. Separation power of the new stationary phase for chromatography and the sample capacity of a SPE sorbent can increase over state of the art silica columns an order of magnitude or more. By use of alkyl derivatives of trialkoxysilanes or other metal oxide precursors, in addition to or instead of tetraalkoxysilanes, an open gel structure groups results that possessing few unreacted silanol.

Figure 2A:
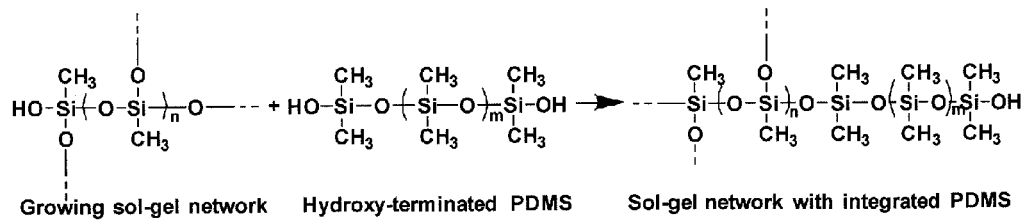
FIG. 2A shows exemplary reaction equations to illustrate the incorporation of hydroxyl-terminated polydimethylsiloxane into a gel with a hydrolyzed and partially condensed methyltrimethoxysilane (MTMS) derived sol, according to an embodiment of the invention.
Figure 2B:
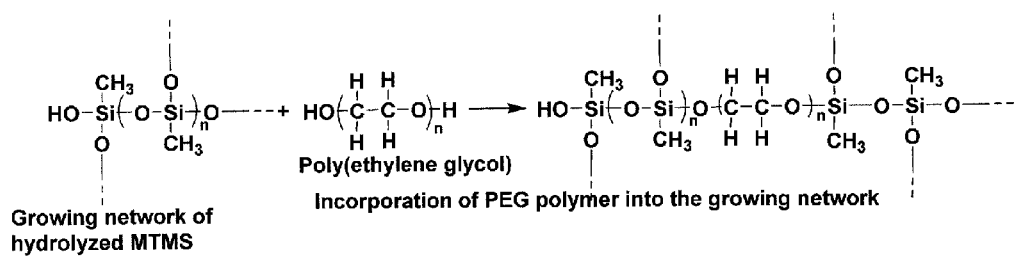
FIG. 2B shows exemplary reaction equations to illustrate the incorporation of polyethylene glycol into a gel with a hydrolyzed and partially condensed MTMS derived sol, according to an embodiment of the invention.

According to embodiments of the invention, the sol-gel method is carried out by hydrolysis of the sol-gel precursor(s) and polycondensation of the hydrolyzed precursor(s), to form a colloidal suspension, which subsequently turns into a 3D polymeric network. According to an embodiment of the invention, where an organic or inorganic polymer that possesses HO-terminal and/or HO-pendent groups is present in the sol solution, the organic polymers are randomly incorporated into the gel network via polycondensation. The formation of the randomly incorporated polymers, such as polydimethylsiloxane (PDMS), polytetrahydrofuran (PTHF) or polyethylene glycol (PEG), is shown in FIGS. 2A and 2B, respectively. In this manner, the polarity and specific associations to the chromatographic stationary phase or SPE sorbent can be specifically designed for a particular type of analyte or variety of analytes by the choice of sol-gel precursors and inorganic or organic polymers for incorporation into the final gel network.

Figure 3A:
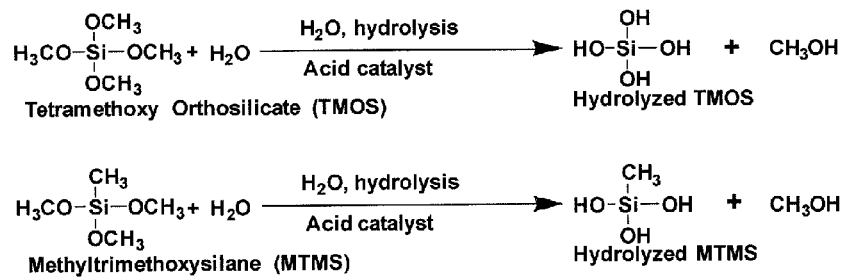
FIG. 3A shows reaction schemes for the hydrolysis of tetramethoxysilane (TMOS) and MTMS.
Figure 3B:
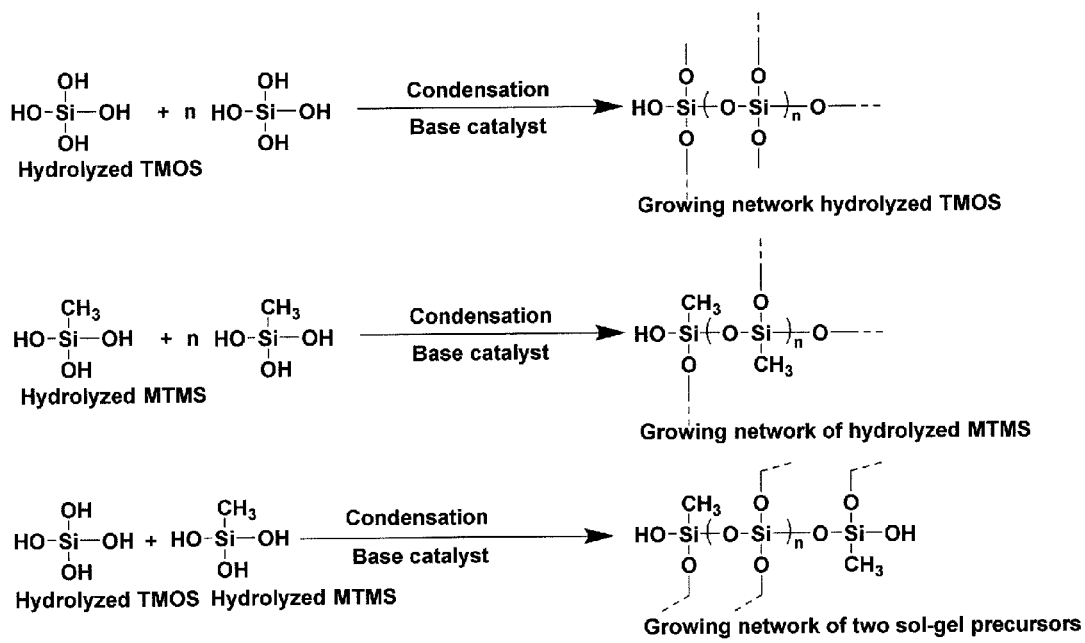
FIG. 3B shows reaction schemes for the self- and cross-condensation of TMOS and MTMS.

Under typical state of the art sol-gel processes with metal alkoxide precursors, the rate and extent of hydrolysis and subsequent polycondensation are dependent on the type and concentration of a single catalyst used in the process, and therefore, the catalyst determines the structure and morphology of the resulting gel. Using an acid catalyst, such as, but not limited to, HCl, TFA, or acetic acid, hydrolysis of the alkoxide precursor proceeds at a faster rate than does condensation and results in an extended or highly linearly connected gel; while, conversely, when catalyzed by a base, such as, but not limited to, NaOH or $NH_4OH$, polycondensation proceeds faster than hydrolysis, resulting in a highly branched and dense gel. In an embodiment of the invention, the sol-gel process is carried out by initially employing acid catalyst, to give a high proportion of hydrolysis, as shown in FIG. 3A for the exemplary hydrolysis of tetramethoxysilane (TMOS) and methyltrimethoxysilane (MTMS), followed by base catalyst to assure high levels of polycondensation, as illustrated in FIG. 3B for the self- and cross-condensation of hydrolyzed TMOS and MTMS. The stepwise use of acid catalysis for hydrolysis and base catalysis for polycondensation results in a gel network with a distinct porous architecture that demonstrates unprecedented robustness with superior thermal, solvent, and chemical stability. This gel structure is rendered even more porous by the use of hydroxyl functionalized polymers.

According to an embodiment of the invention, many different inorganic or organic polymers can be into the sol-gel network anchored by strong covalent bonding throughout the gel. The selectivity for non-polar through highly polar analytes for the gel is defined by the nature of the polymer included in the sol solution for condensation with hydrolyzed sol-gel precursors. As a result, the gel materials demonstrate high resistance against high temperature, harsh chemical environment, with pH stability that can range from 1-12, and significant swelling when exposed to organic solvents. The sol-gel formed gel particles are useful for improved and new stationary phases in reversed phase liquid chromatography (RP-HPLC), normal phase liquid chromatography (NP-HPLC), stationary phases in hydrophilic interaction chromatography (HILAC), and solid phase extraction (SPE) sorbents. The RP-HPLC, NP-HPLC, HILAC, and SPE sorbents, for example, but not limited to sorbents in solid phase microextraction, can be used in the fields of food analysis, pharmaceutical analysis, environmental analysis, toxicological analysis, clinical analysis, and forensic analysis. The sorbents can also be used for environmental remediation and antimicrobial and/or other protective coatings in food or pharmaceutical packaging.

Methods and Materials

Formulations for sorbents, normal phase chromatography stationary phases, HILIC stationary phases, or SPE sorbents for separation and absorbance of non-polar, medium-polar, and highly-polar analytes is given in FIGS. 4, 5, and 6, respectively. The TMOS and/or MTMS were combined with the aqueous acid catalyst solution to promote hydrolysis, and subsequently the hydroxyl terminated PDMS, PTHF, or PEG. The base catalyst solution was added to the hydrolyzed sol to promote gelation. Following gelation, the sol-gel sorbent monoliths were subjected to conditioning/aging at 50° C. for 24 hours. After aging, the sol-gel sorbent monoliths were crushed and washed with methylene chloride to remove any unreacted precursors, unbound polymers, reaction byproducts, and solvents from the sol-gel sorbent. The sol-gel sorbent gel was then dried under vacuum at 50° C. for overnight. The dried sol-gel sorbent particles are then further crushed, milled, and screened to obtain desired sol-gel sorbents of a desired particle size. Particles may be treated with silane coupling agents such as hexamethyldisilazane (HMDS) to cap residual silanol groups of the gel that is the SPE sorbents.

Figure 8:
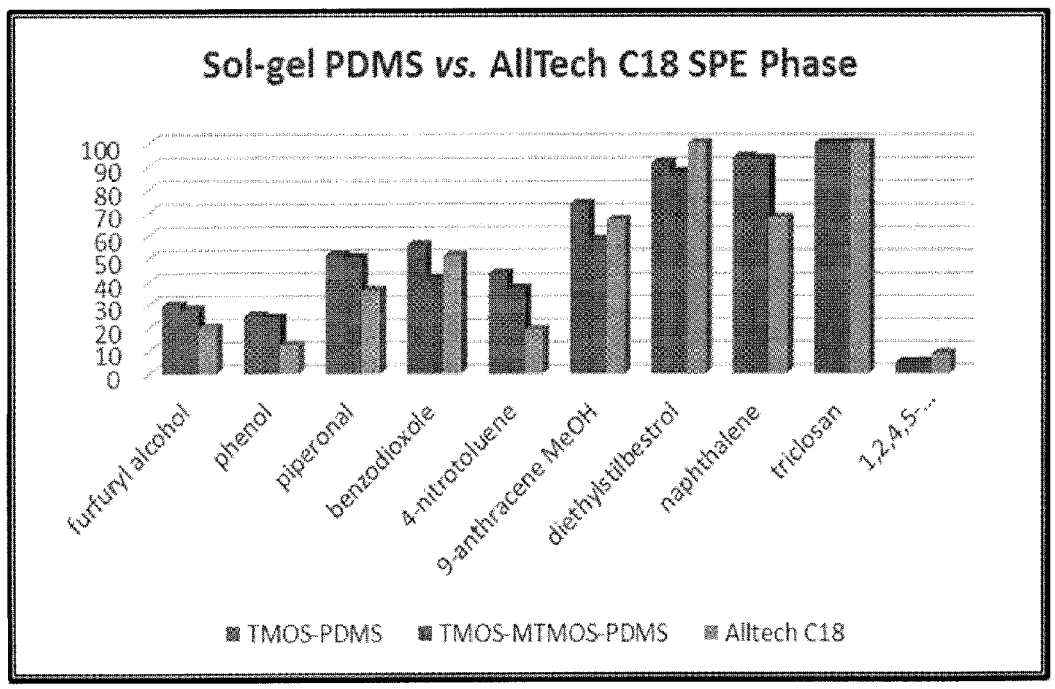
FIG. 8 is a bar chart of the percent extraction efficiencies for the compounds of FIG. 7 for the SPE sorbents including hydroxyl terminated polydimethylsiloxane for absorbing non-polar analytes, according to embodiments of the invention.
Figure 9:
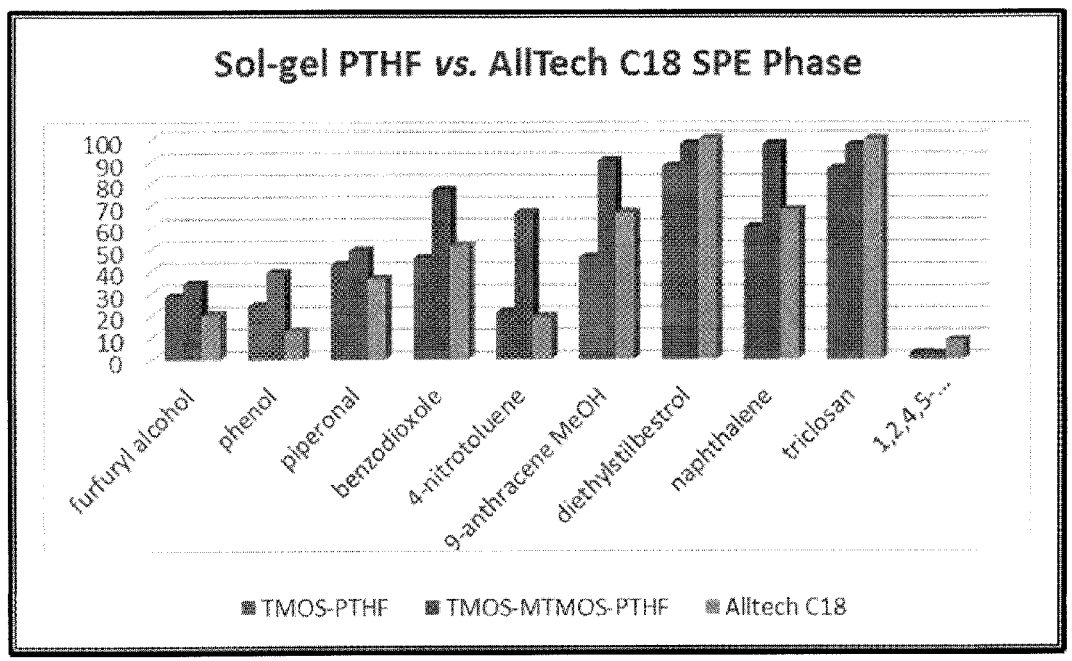
FIG. 9 is a bar chart of the percent extraction efficiencies for the compounds of FIG. 7 for the SPE sorbents including polytetrahydrofuran (poly-THF), for absorbing or separating medium-polar analytes, according to embodiments of the invention.
Figure 10:
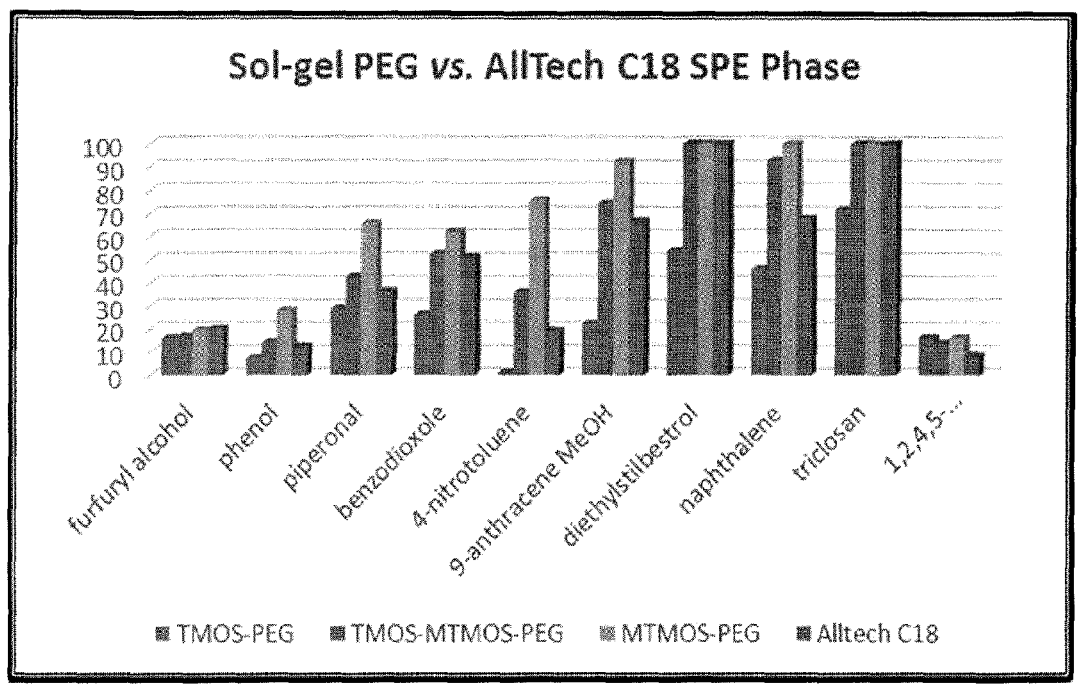
FIG. 10 is a bar chart of the percent extraction efficiencies for the compounds of FIG. 7 for the SPE sorbents including polyethylene oxide (PEO), for absorbing or separating highly-polar analytes, according to embodiments of the invention.

To examine the extraction efficiencies of the Gels as SPE sorbents, ten compounds, tabulated in FIG. 7, were examined in contrast to a commercial sorbent: Alltech® C18 SPE Sorbent for SPE sorbents designed for the absorbance of non-polar, medium-polar, and highly-polar analytes, as shown in FIGS. 8, 9, and 10, respectively. Regardless of the chemical make-up of the sol-gel sorbents, all outperformed the Alltech C18 solid phase extraction sorbent for nearly all analytes.

It should be understood that the examples and embodiments described herein are for illustrative purposes only and that various modifications or changes in light thereof will be suggested to persons skilled in the art and are to be included within the spirit and purview of this application.

We claim:

1. A sol-gel sorbent or chromatography stationary phase, comprising particles of a metal oxide gel containing polymeric segments uniformly distributed throughout the metal oxide gel.

2. The sol-gel sorbent or chromatography stationary phase according to claim 1, wherein the metal oxide gel is a gel formed by sol-gel hydrolysis and condensation from one or more hydrolysable precursor wherein metal sites in the gel have the structure $R_xMO_{(y-x)}$ where M is titanium, aluminum, zirconium, germanium, barium, gallium, indium, thallium, vanadium, cobalt, nickel, chromium, copper, iron, zinc, boron or any mixture thereof, x is 0 or 1, y is the valence of the metal, and R is $C_1$ to $C_6$ alkyl or any $C_6$ to $C_{14}$ aryl or polyaryl group where the alkyl or aryl group optionally is functionalized with $C_1$ to $C_{20}$ alkyl, $C_6$ to $C_{14}$ aryl, halo, hydroxy, alkoxy, aryloxy, or any other group incapable of neutralizing an acidic or basic catalysts useful for forming the metal oxide gel.

3. The sol-gel sorbent or chromatography stationary phase according to claim 1, wherein the polymeric segments are selected from at least one of silicones, polyethers, acrylates, methacrylates, polyesters, or polyamides.

4. The sol-gel sorbent or chromatography stationary phase according to claim 1, wherein the metal oxide gel is a silicon oxide gel where the polymeric segments are polydimethylsilioxanes, polytetrahydrofurans, or polyethylene oxides.

5. The sol-gel sorbent or chromatography stationary phase according to claim 1, further comprising functionalized sites wherein at a least a portion of free hydroxyl groups of the metal oxide gel containing polymeric segments are capped with a non-functional or functional trialkylsilane and/or a aryl dialkylsilane.

6. A reversed phase high-performance liquid chromatography (RP-HPLC), a normal phase high-performance chromatography (NP-HPLC) column or a hydrophilic interaction chromatography (HILIC) column, comprising the chromatography stationary phase according to claim 1.

* * * * *